May 30, 1944.  E. W. ELLIOTT ET AL  2,349,948
REFACING AND RESEATING TOOL
Filed Dec. 8, 1939

INVENTORS

Patented May 30, 1944

2,349,948

UNITED STATES PATENT OFFICE 2,349,948

REFACING AND RESEATING TOOL

Elmer W. Elliott and Ole O. Rothe, Minneapolis, Minn.; said Rothe assignor to Anna M. Rothe, Minneapolis, Minn.

Application December 8, 1939, Serial No. 308,143

3 Claims. (Cl. 90—12.5)

This invention relates to new and useful improvements in valve refacing and reseating tools.

An object of the present invention is to provide an improved valve refacing and reseating tool comprising a body having a plurality of groups of teeth provided on a face thereof and the teeth of said groups of teeth being so arranged that a shearing action is obtained, when the tool is operated on the work, thereby eliminating vibration or chattering of the tool and whereby a smooth cut is obtained.

A further object is to provide a tool of the class described comprising a body having a plurality of groups of teeth provided on the bottom face thereof and the teeth of each group being arranged in spaced parallel relation, and being disposed in right angular relation to the teeth of adjacent groups, whereby the cutting edges of all of said teeth are tangentially disposed with respect to the axis of said body, thereby to provide a shearing cut when the tool is operated on the work.

A further object is to provide a tool of the class described comprising a body having a central opening therein and provided at its bottom face with a plurality of tangential cutting teeth, and a suitable guide having a head seated against the bottom face of the tool body and provided with a cylindrical extension removably received in said opening, and means being provided in said opening whereby a suitable operating member may be connected to the tool body to drive the same.

Other objects of the invention reside in the novel arrangement of the groups of teeth provided on the bottom face of the tool body, whereby the chips removed from the work during operation of the tool are constantly conveyed outwardly by the cutting action of the teeth, whereby the tool is self-cleaning; in the provision of such a tool having an auxiliary tooth adjustably secured to the periphery thereof to further extend the usefulness of the tool; in the provision of such a tool which may readily be used for refacing the seats of such valves as globe, gate and check valves, and various other valves, which may require their seats to be reconditioned at times; and, in the provision of such a tool which is simple and inexpensive in construction.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

Figures 2, 3:
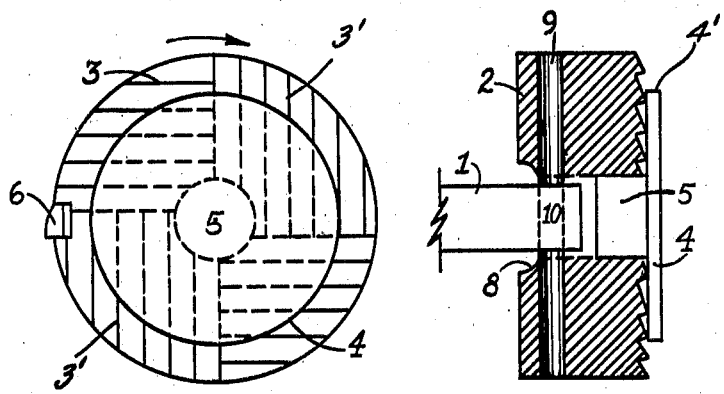
Figure 2 is a cross-sectional view of the tool body showing the guide and operating member or shank attached thereto.
Figure 3 is a plan view of the cutting face of the tool, with the guide positioned thereon.

The novel tool herein disclosed is shown comprising a body 2 having its bottom face provided with a plurality of groups of cutting teeth, generally designated by the numerals 3 and 3', as best shown in Figure 3. As here shown, the teeth of each group are disposed in spaced parallel relation, and the teeth of each group are arranged in right angular relation to the teeth of adjacent groups. In the tool as shown in Figure 3, four groups of teeth are provided and alternate groups may be provided with even and uneven numbers of teeth. In other words, as shown in Figure 3, the diametrically opposed groups 3 are shown provided with an even number of teeth, whereas groups 3' are shown provided with an uneven number of teeth. If desired, however, all of the groups may have the same number of teeth.

An important feature of the invention resides in the unique arrangement of the various groups of teeth on the bottom face of the tool body, wherein the cutting edges of the teeth are tangentially disposed with respect to the axis of the tool body. This is important in that by so arranging the teeth, they have a shearing action on the work, whereby vibration and chattering is entirely eliminated and a smooth cut is obtained. It is to be understood that the number of groups of teeth provided on the cutting face of the tool body may be varied, as desired, without departing from the scope of the invention.

A suitable guide, generally indicated by the numeral 4, is shown detachably secured to the tool body. The guide has a face 4' adapted to engage the wall of the usual opening or passage in the valve, and thereby retain the tool body in concentric relation to the valve seat to be refaced.

To detachably secure the guide 4 to the tool body 2, the guide is shown provided with a cylindrical extension 5 adapted to be received in a central bore provided in the tool body, as best shown in Figure 2. Suitable means, not shown, may be provided in the tool body for securing the guide against accidental separation from the tool body. Guides of different sizes may be interchangeably supported in the tool body to adapt the cutter for different sizes and types of valve seats.

Figure 1:
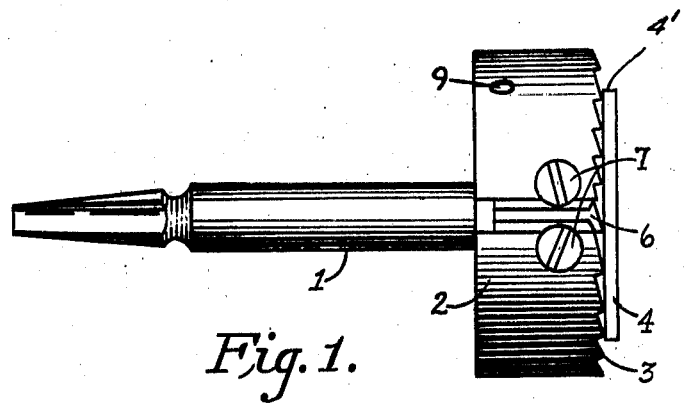
Figure 1 is an outside view of the entire tool.

To extend the usefulness of the tool, an auxiliary tooth 6 is shown mounted in a guideway provided in the periphery of the tool body, and is removably and adjustably secured therein by suitable securing elements or screws 7, shown in Figure 1. The auxiliary cutting tooth 6 has a lower cutting terminal adapted to engage the work, as will be understood by reference to Figures 1 and 3.

The tool may be operated by means of a suitable operating member, such as a shank 1 having a transverse aperture 10 at its lower end adapted to receive a hardened steel pin 9, which traverses the cylindrical opening in the body 2 and has its end portions suitably secured in said body. The connection between the lower end of the shank 1 is such as to permit universal movement of the shank 1 with respect to the tool body, when the tool is in use. The upper portion of the central opening in the tool body is preferably enlarged, as shown at 8 in Figure 2, to permit freedom of movement of the lower end of the shank 1, when the latter is operated at an angle with respect to the tool body. In other words, the lower end of the shank is loosely connected to the tool body by means of the pin 9 and enlarged opening 10 in the shank, whereby a universal connection is provided between the shank and tool body. The outer end of the shank 1 is preferably squared as shown, to facilitate attachment thereto of a suitable actuating member, not shown.

The novel tool herein disclosed has been found extremely practical and efficient in the operation of refacing and reseating worn valve seats of various types of valves. The unique arrangement of the teeth on the bottom face of the body of the tool assures a clean smooth cut, and the guide 4 provides a simple means for maintaining the tool in proper alinement with the valve seat. The universal connection between the shank 1 and tool body also makes it possible to operate the tool with the shank disposed at an angle with respect to the axis thereof.

In the drawing, we have shown the tool body as being substantially cylindrical in form and provided at its bottom face with a plurality of groups of cutting teeth. It is to be understood, however, that the configuration and size of the tool body may be varied to suit certain requirements without departing from the scope of the invention as, for example, a valve seat of large diameter obviously may require a tool having a cutting face of relatively larger diameter than would be required by a smaller valve seat, and, in like manner, it might be necessary in some instances, that the general shape of the tool body be somewhat changed from the form shown in order to gain access to the worn seats of certain types of valves.

The universal connection between the shank and tool body is preferably so constructed that the shank may be detached from the tool body to facilitate storage, and whereby the operation of applying the tool to the seats of certain types of valves such as check and gate valves is facilitated. In refacing the seats of such valves, it may be necessary to remove the tool body from the shank, as will readily be understood, in order to apply the tool to the valve seat. This may readily be accomplished by supporting the pin 9 in the tool body in such a manner that it may be removed therefrom, or, if found more desirable, the lower end of the shank or operating member 1 may have a detachable connection with the pin 9 or the tool body.

We claim as our invention:

1. A tool for refacing and reseating the seats of globe, gate and check valves, said tool comprising a cylindrical body having a central opening therein, the bottom face of said body being circular in configuration and having a plurality of groups of cutting teeth provided over the entire surface thereof, the teeth of each group extending from and being arranged in non-parallel relation to the teeth of an adjacent group, and means in said central aperture for attaching an operating member to said body, the tool adapted for rotation in a direction to permit the teeth to have a shearing action on the work and also to permit the chips removed from the work to be conveyed outwardly by the cutting action of said teeth.

2. A valve refacing and reseating tool comprising a body having a central opening therein, the bottom face of said body being provided with a plurality of groups of cutting teeth and the teeth of each group being arranged in spaced parallel relation, and the teeth of one group being arranged in substantially right angular relation to the teeth of adjacent groups, a guide having a portion detachably received in said opening, and means whereby said body may be rotated to operate the tool.

3. A valve refacing and reseating tool comprising a body having a central opening therein, the bottom face of said body being provided with a plurality of groups of teeth, and the teeth of each group being disposed in angular relation to the teeth of adjacent groups, a guide having a portion fitted against the bottom face of said body and having an extension detachably received in said central opening, means in said opening whereby an operating member may be operatively connected to said body to rotate the tool, and an auxiliary tooth detachably and adjustably secured to the periphery of the tool body.

ELMER W. ELLIOTT.
OLE O. ROTHE.